March 24, 1931.  R. M. DILWORTH  1,797,548
ARTICULATED SELF PROPELLED RAILWAY VEHICLE
Filed Sept. 14, 1929
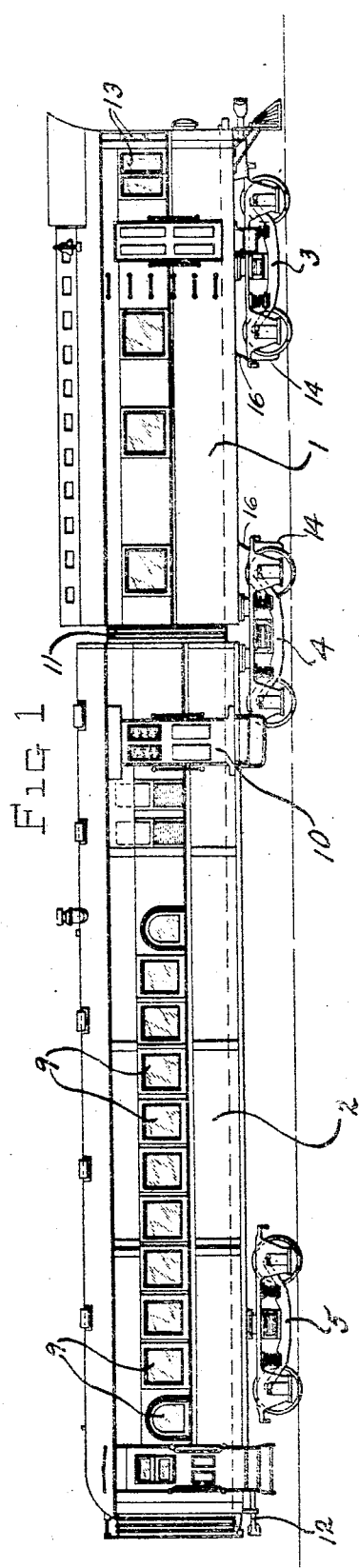
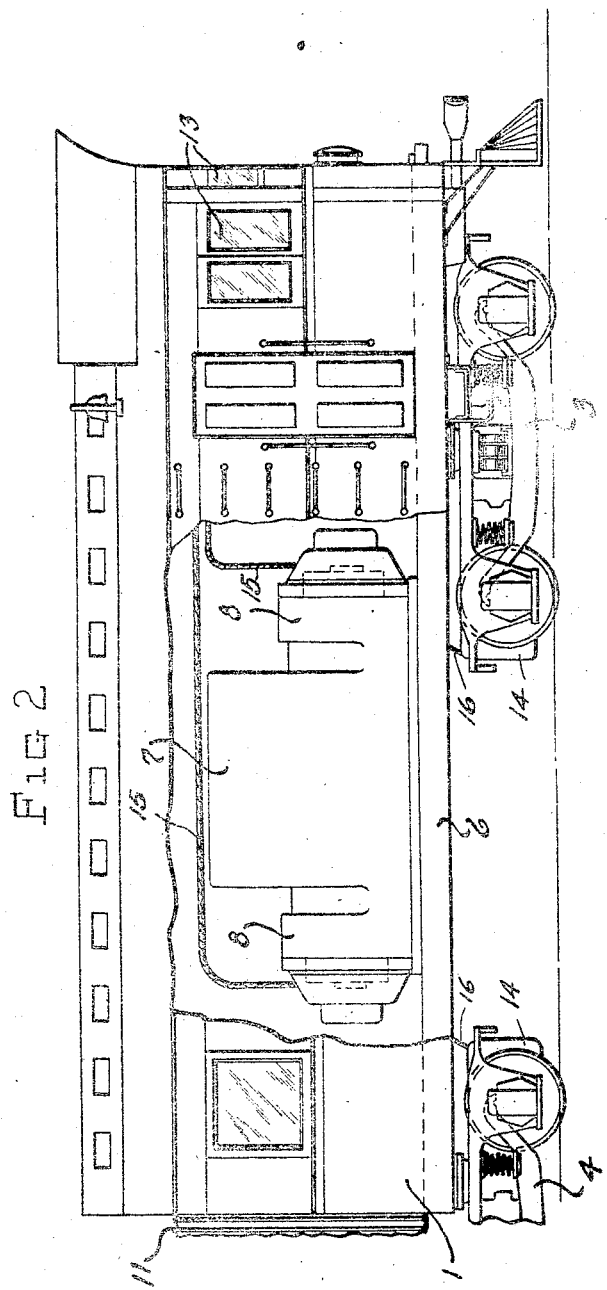
INVENTOR
RICHARD M. DILWORTH
BY
Brockett, Hyde, Higley & Meyer
ATTORNEY Patented Mar. 24, 1931

1,797,548

UNITED STATES PATENT OFFICE

RICHARD M. DILWORTH, OF LAKEWOOD, OHIO, ASSIGNOR TO THE ELECTRO-MOTIVE COMPANY, OF CLEVELAND, OHIO, A CORPORATION OF OHIO

ARTICULATED SELF-PROPELLED RAILWAY VEHICLE

Application filed September 14, 1929. Serial No. 392,568.

This invention relates to articulated rail cars of the type which are self-propelled by internal combustion means.

Where an internal combustion engine is thus employed as a prime mover the required body structure for supporting the same is more rigid and heavy than is necessary or desirable for revenue car usage. Considerable heat, noise and vibration are always attendant upon operation of an internal combustion engine and are all undesirable in a revenue car. A maximum weight is of course always desirable on driving trucks whereas minimum weight on trailer trucks is always equally desirable. The driving trucks should be arranged as close as possible to their source of power. Obviously the revenue portion of the car should be as great a portion of the whole as possible.

The object of the present invention is to provide a car of the class described which shall in consideration of the above, have a greater average efficiency as to its component parts and their arrangement and therefore a greater overall efficiency, than has heretofore been accomplished in the art.

To this end I provide a car comprising a forward body section having a power plant including an internal combustion engine, a pair of driving trucks for supporting the same, transmission means whereby said trucks may receive motive power from said power plant, a revenue car body supported at its forward end by the rearward of said trucks, and a trailing truck arranged to support the rearward portion of said revenue car body.

The exact nature of the invention together with further objects and advantages thereof will be apparent from the following description taken in connection with the accompanying drawings in which Fig. 1 is a side elevation of a car representing an embodiment of my invention and Fig. 2 is an enlarged detail of the propulsion part of the car, a portion of the near side being broken away to show parts therewithin.

With reference now to the drawings, the principal parts of the car visible from its side are a forward body section 1, rearward body section 2 and trucks numbered 3, 4 and 5 in their order of arrangement. The forward car body 1 is relatively short and includes a rigid frame 6 which serves to support the internal combustion engine indicated at 7 together with means directly driven thereby such as the indicated pair of direct connected generators 8. The length of this forward section 1 is preferably only sufficient to accommodate these parts together with their usual necessary auxiliaries such as fuel supply, cooling and ignition systems for the engine, compressor for the air brake system and a small space for the operating personnel which usually comprises one engineer only, the principal part of which space is the driver's compartment at the front of the section and indicated by the windows 13.

The rear body section 2 is relatively long and of light construction; and its sole purpose is for revenue. As shown in Fig. 1 this revenue section is adapted for passenger traffic as indicated by the windows 9, with a small baggage compartment at its forward end indicated by the baggage door 10; but it will be appreciated that the transportation of mail, baggage, express, passengers or freight is embraced within the term revenue. The two sections are arranged in close coupled relation and have the usual doors at their adjoining ends so that a passage therebetween is had, the usual bellows 11 being arranged about the passage way. The rear end of the revenue section may be equipped with coupling means 12 for draft connection with trailers whereby a train may be made up if desired.

The forward truck 3 supports the forward end of the forward section 1. The middle truck 4 supports both the rearward end of the forward section 1 and the forward end of the revenue section 2; while the rearward truck 5 supports the rearward end of the revenue section 2. It will be appreciated that the mounting of each section upon each of its trucks includes the usual swivel connection, each of the trucks being of multiple-axle type.

The two forward trucks are drivers, having associated therewith driving means, such as electric motors 14 mounted thereon. Preferably also each wheel of these trucks is a driven wheel the driving being effected in any convenient manner such as by gearing or by mounting the motor armatures directly on the axles.

The motors are driven by the generators 8 through suitable transmission means including the usual electric connections and controllers arranged for operation by the engineer at the front of the forward section 1. Thus the connections include cables 15 leading from the generators to the controllers, and cables 16 leading from the controllers to the motors 14. The rearward truck 5 is a trailer.

It will be noted that by the disclosed construction and arrangement of the parts, the forward section is short, and relatively heavy. Provision for the weight of the prime mover and its associated parts is therefore conveniently had. This weight is superimposed solely upon the driving trucks. The driving trucks are located closely adjacent their source of power so that transmission problems are simplified and transmission losses minimized. It will be noted that two-axle trucks and therefore of short rigid wheel base, are shown in the drawings; so that the described concentration of power plant weight on driving wheels does not increase the rigid wheel base which is short. Further, the distribution of weight is even over a large number of driving wheels in trucks of short rigid wheel base, the power plant being concentrated so as to occupy a minimum of space. By increasing the number of uniformly loaded driving wheels while retaining the use of two-axle trucks the tractive effort to be transmitted through any single body center plate is reduced. By allowing the use of two-axle trucks under the power plant the platform height of the power plant section of the car is reduced and the space available for cooling increased yet maintained within the equipment clearance limits of standard railroads. On the other hand the revenue section is relatively long and may be of the usual light weight and of construction dependent upon the type of revenue service for which it is intended.

Thus production of the forward section which is by far the more expensive of the two may be standardized. By mounting the forward end of the revenue section upon the rear truck of the power plant section a longer revenue section may be provided which will pass over a greater maximum curvature than would otherwise be possible. The body sections being separate transmission of the heat, sound and vibration which necessarily follow from operation of a power plant of the class described, is not transmitted to the revenue section of the car, the described arrangement providing inherent insulation against such transmission.

What I claim is:

An articulated self-propelled rail car comprising a forward body section having a power plant, a pair of driving trucks for supporting the same, said trucks being located one substantially forward and one substantially rearward of the center of mass of said plant, transmission means whereby said trucks may receive motive power from said power plant, a revenue car body supported at its forward end by the rearward of said trucks, and a trailing truck arranged to support the rearward portion of said revenue car body.

In testimony whereof I hereby affix my signature.

RICHARD M. DILWORTH.